(12) United States Patent
Laubmann et al.

(10) Patent No.: US 10,830,315 B2
(45) Date of Patent: Nov. 10, 2020

(54) COMPACT MOTOR VEHICLE TRANSMISSION

(71) Applicant: Bayerische Motoren Werke Aktiengesellschaft, Munich (DE)

(72) Inventors: Jonas Laubmann, Munich (DE); Julian Mangold, Munich (DE); Thomas Schleich, Weilheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/502,219

(22) Filed: Jul. 3, 2019

(65) Prior Publication Data

US 2019/0331201 A1    Oct. 31, 2019

Related U.S. Application Data

(63) Continuation of application No. PCT/EP2018/051776, filed on Jan. 25, 2018.

(30) Foreign Application Priority Data

Jan. 31, 2017 (DE) .......................... 10 2017 201 484

(51) Int. Cl.
*F16H 3/66* (2006.01)

(52) U.S. Cl.
CPC .......... *F16H 3/66* (2013.01); *F16H 2200/006* (2013.01); *F16H 2200/0008* (2013.01); *F16H 2200/201* (2013.01); *F16H 2200/2046* (2013.01)

(58) Field of Classification Search
CPC ............... F16H 3/66; F16H 2200/0008; F16H 2200/006; F16H 2200/201; F16H 2200/2046
See application file for complete search history.

(56) References Cited

U.S. PATENT DOCUMENTS

2009/0082159 A1*  3/2009  Phillips .................... F16H 3/66
                                                                475/218
2009/0082167 A1    3/2009  Wittkopp et al.
(Continued)

FOREIGN PATENT DOCUMENTS

DE    10 2008 048 312 A1    4/2009
DE    10 2012 224 115 A1    6/2014
(Continued)

OTHER PUBLICATIONS

International Search Report (PCT/ISA/210) issued in PCT Application No. PCT/EP2018/051776 dated May 7, 2018 with English translation (six (6) pages).
(Continued)

*Primary Examiner* — David J Hlavka
(74) *Attorney, Agent, or Firm* — Crowell & Moring LLP

(57) ABSTRACT

A motor vehicle transmission includes: a transmission input shaft and a transmission output shaft having a transmission housing; three planetary gear sets, each of which includes the transmission elements of a sun pinion, ring gear and planet carrier for rotatably receiving at least one planet gear and which are provided with a plurality of torque transmission devices for changing a transmission ratio between the transmission input shaft and the transmission output shaft; and two spur gear stages, each having a first spur gear, which is arranged concentrically with respect to the transmission input shaft and a second spur gear, which is arranged concentrically with respect to the transmission output shaft. The second and third planetary gear sets are connected to each other by a first coupling and a second coupling. For the first coupling, one of the transmission elements of the second planetary gear set is connected to the same transmission element of the third planetary gear set. For the second coupling, a further one of the transmission elements (Continued)

of the second planetary gear set is connected to a further one of the transmission elements of the third planetary gear set.

19 Claims, 2 Drawing Sheets

(56) References Cited

U.S. PATENT DOCUMENTS

| | | | |
|---|---|---|---|
| 2010/0029433 A1 | 2/2010 | Tenberge | |
| 2012/0088627 A1* | 4/2012 | Phillips | F16H 3/66 475/275 |
| 2016/0017959 A1* | 1/2016 | Beck | F16H 3/66 475/275 |
| 2018/0222306 A1 | 8/2018 | Venturi | |

FOREIGN PATENT DOCUMENTS

| | | |
|---|---|---|
| DE | 10 2012 224 118 A1 | 6/2014 |
| JP | 2000-304110 A | 11/2000 |
| JP | 2000-310301 A | 11/2000 |
| JP | 2005-48869 A | 2/2005 |
| WO | WO 2008/116449 A1 | 10/2008 |
| WO | WO 2014/075851 A1 | 5/2014 |
| WO | WO 2016/091656 A1 | 6/2016 |

OTHER PUBLICATIONS

German-language Written Opinion (PCT/ISA/237) issued in PCT Application No. PCT/EP2018/051776 dated May 7, 2018 (22 pages).

German-language Office Action issued in counterpart German Application No. 10 2017 201 484.9 dated Jul. 5, 2017 (three (3) pages).

Belz T., "Varianten von Mehrgang-Planetengetrieben", Mar. 8, 2016, https://register.epo.orq/application?documentid=EYPWMGE67270DSU&appnumber=EP13756488&showPdfPage=all, XP055257458 (19 pages).

Fu Y. et al., "A New Archetype of Automatic Transmission", SAE International, Apr. 12, 2011, vol. 1, XP55214452 (six(6) pages).

* cited by examiner

| Gears | Torque transmission devices | | | | | |
|---|---|---|---|---|---|---|
| | SE1 | SE2 | SE3 | SE4 | SE5 | SE6 |
| Reverse gear | | | X | | X | |
| 1st gear | X | | X | | | |
| 2nd gear | X | X | | | | |
| 3rd gear | X | | | | X | |
| 4th gear | X | | | | | X |
| 5th gear | | | | | X | X |
| 6th gear | | X | | | | X |
| 7th gear | | | | X | | X |
| 8th gear | | X | | X | | |

| Gears | Torque transmission devices | | | | | |
|---|---|---|---|---|---|---|
| | SE1 | SE2 | SE3 | SE4 | SE5 | SE6 |
| Reverse gear | | | X | | X | |
| 1st gear | X | | X | | | |
| 2nd gear | X | X | | | | |
| 3rd gear | X | | | | X | |
| 4th gear | X | | | | | X |
| 5th gear | | | | | X | X |
| 6th gear | | X | | | | X |
| 7th gear | | | | X | | X |
| 8th gear | | | | X | X | |

COMPACT MOTOR VEHICLE TRANSMISSION

CROSS REFERENCE TO RELATED APPLICATIONS

This application is a continuation of PCT International Application No. PCT/EP2018/051776, filed Jan. 25, 2018, which claims priority under 35 U.S.C. § 119 from German Patent Application No. 10 2017 201 484.9, filed Jan. 31, 2017, the entire disclosures of which are herein expressly incorporated by reference.

BACKGROUND AND SUMMARY OF THE INVENTION

The invention relates to a compact motor vehicle transmission having three planetary gear sets. Such a motor vehicle transmission is known from DE 10 2008 048 312 A1.

In motor vehicles, a limited installation space potential prevails within which certain functions have to be realized, this also applies to the motor vehicle transmission. With the motor vehicle transmission, a certain transmission spectrum has to be covered so that the characteristic map (rotational speed, torque) of the prime mover, generally an internal combustion engine and/or an electric motor, can be adapted to the load requirements of the motor vehicle as arising from the road resistance.

Here it is fundamentally known from the prior art to divide multiple planetary gear sets over two transmission shafts and couple the same by means of brakes or clutches among one another or to the transmission housing in such a manner that a multiplicity of different transmission ratios can thereby be realized in a small installation space.

For this purpose, DE 10 2008 048 312 A1 proposes an automatic transmission comprising a first planetary gear set that can be coupled to the transmission input shaft and is arranged concentrically relative to the same and a second and a third planetary gear set which are arranged concentrically relative to the transmission output shaft.

It is an object of the invention to provide a compact motor vehicle transmission having three planetary gear sets and, in particular, eight forward and one reverse gear.

The invention provides a motor vehicle transmission having a transmission input shaft and a transmission output shaft. These transmission input and transmission output shafts are arranged axially parallel and radially spaced apart from one another in a transmission housing. In particular, a particularly space-saving construction of the motor vehicle transmission is made possible by means of such an arrangement. Such a configuration is advantageous in particular for a so-called front transverse drive architecture (front drive, drive motor arranged transversely to the traveling direction of the motor vehicle). For realizing a multiplicity of different transmission ratios between the transmission input and the transmission output shaft, in particular exactly eight forward gears and one reverse gear, the motor vehicle transmission comprises multiple planetary gear sets, preferentially the motor vehicle transmission comprises exactly three planetary gear sets.

In this sense, a planetary gear set is to be understood to mean an epicyclic gear set which comprises a sun pinion, an internal gear and a planet-gear carrier. Here, the planet-gear carrier is equipped in particular for mounting, i.e. for the rotatable reception, of at least one, preferentially a multiplicity of planet gears. Preferably, this at least one planet gear is in engagement both with the sun pinion and also with the internal gear. Such a planetary gear set is known from the prior art as a so-called minus gear set. A planetary gear set in this sense is likewise be understood to mean an epicyclic gear set, which comprises a sun pinion, an internal gear and a planet-gear carrier, wherein on the planet-gear carrier at least two planet gears are rotatably mounted and wherein these two planet gears are in engagement with one another and should thus be considered as a planet gear pair. Furthermore, one of these planet gears is in engagement with the sun pinion and the other one of these planet gears is in engagement with the internal gear. Preferably, the planet-gear carrier comprises a multiplicity of such planet gear pairs. Such an epicyclic gear set is known from the prior art as so-called plus gear set.

The motor vehicle transmission according to the invention can be realized both with one or more plus gear sets, wherein the remaining planetary gear sets are designed as minus gear sets, and with one or more minus gear sets, wherein the remaining planetary gear sets are embodied as plus gear sets. Preferably, all planetary gear sets are designed as plus gear sets or preferably as minus gear sets.

Furthermore, the motor vehicle transmission comprises the transmission housing, while this transmission housing is to be understood to mean a housing device for receiving and mounting the transmission input and transmission output shaft. Further preferably, the three planetary gear sets are received in the transmission housing.

In the transmission housing, the first planetary gear set is preferably arranged concentrically relative to the transmission input shaft and the second and third planetary gear set are preferably arranged concentrically relative to one another and preferably concentrically relative to the transmission output shaft.

In terms of the invention, a transmission element of one of the planetary gear sets is to be understood to mean an element of the relevant epicyclic gear set, i.e. the sun pinion, internal gear and planet-gear carrier of the same, wherein the planet-gear carrier, as shown, is provided for the rotatable reception of at least one planet gear and comprises at least one planet gear, preferably a multiplicity of planet gears are rotatably mounted on the planet-gear carrier.

In the motor vehicle transmission, a multiplicity of torque transmission devices are provided which are equipped for the selective changing of the transmission ratio between the transmission input shaft and the transmission output shaft. Preferably, a torque transmission device is to be understood to mean a brake, a coupling or a synchronization. Further preferably, a torque transmission device is equipped for the positively engaged, preferably frictionally engaged and particularly preferably positively frictionally engaged selective non-rotatable establishment of a torque-conducting connection between two components, in particular between two transmission elements or between a transmission element and the transmission housing.

In this sense, the selective non-rotatable establishment is to be understood to mean that a torque transmission device has two operating states, wherein in the first operating state (torque transmission device deactivated) no torque or no power can be transmitted by the torque transmission device, and in the second operating state (torque transmission device activated) a torque or a power can be transmitted with the same and furthermore this second operating state can be selectively, i.e. optionally established.

In particular, a synchronization is equipped for establishing a positive frictionally engaged torque-conducting connection. Different designs of torque transmission devices are known from the prior art.

In terms of the invention, a spur gear stage is to be understood to mean a gear transmission having at least two gears, preferably spur gears, wherein these gears are equipped for power transmission. Based on the power transmission from the transmission input shaft to the transmission output shaft, the spur gear stage is arranged between these transmission shafts. Preferably, a spur gear stage comprises more than two gears, preferably three gears; in particular with a spur gear stage having three gears, the direction of rotation relative to a spur gear stage with two gears can be reversed and thus an adaptation of the direction of rotation is made possible, in particular in the case that this direction of rotation reversal is necessary by virtue of the use of a plus or minus gear set.

Preferably, a first spur gear of such a spur gear stage is arranged concentrically relative to the transmission input shaft and a second spur gear is arranged concentrically relative to the transmission output shaft. The motor vehicle transmission according to the invention comprises in particular two such spur gear stages.

The second and third planetary gear set of the motor vehicle transmission are connected to one another via a first and a second coupling. Here, such a coupling in this sense is to be understood to mean a torque-conducting and non-rotatable or rotationally rigid connection between two transmission elements, of which one belongs to the second planetary gear set and the other to the third planetary gear set.

In particular for the first coupling it is provided that one of the transmission elements of the second planetary gear set is connected to the respective same transmission element of the third planetary gear set. The "same transmission element" in this sense is to be understood to mean that the sun pinion of the second planetary gear set is connected to the sun pinion of the third planetary gear set or the planet-gear carrier of the second planetary gear set is connected to the planet-gear carrier of the third planetary gear set or the internal gear of the second planetary gear set is connected to the internal gear of the third planetary gear set.

For a second coupling it is provided that a further transmission element, i.e. in particular not the same transmission element that is already involved in the first coupling, is connected to a further transmission element of the third planetary gear set in a non-rotatable or rotationally rigid manner. In particular it can be provided for this second coupling that for the same, the same transmission elements of the second are also connected to the third planetary gear set or preferably different transmission elements of these two planetary gear sets are connected to one another. Investigations have shown that in particular with such a construction a motor vehicle transmission having three planetary gear sets, eight forward and one reverse gear can be realized in a small installation space and with high efficiency and large transmission spacing and in particular by way of this an efficient motor vehicle drive can be realized.

In a preferred embodiment of the invention, the transmission input shaft is non-rotatably, in particular permanently non-rotatably connected to the sun pinion of the first planetary gear set. In particular by means of such a configuration, a particularly simple construction of the motor vehicle transmission is made possible.

In a preferred embodiment of the invention, the sun pinion of the first planetary gear set is non-rotatably connected, in particular permanently non-rotatably connected to the first spur gear of the first spur gear stage. In particular by means of such a configuration, a direct through-drive from the transmission input shaft to the first spur gear stage is made possible and an efficient drive is thereby achievable.

In a preferred embodiment of the invention, the planet-gear carrier of the first planetary gear set is non-rotatably connected to the first spur gear of the second spur gear stage. In particular by means of such a configuration, a direct power transmission from the first planetary gear set to the second spur gear stage is made possible and a compact construction of the motor vehicle transmission is thereby achievable.

In a preferred embodiment of the invention, the internal gear of the first planetary gear set is selectively non-rotatably connectable with a first of the torque transmission devices to the transmission housing. In particular by means of such an arrangement of the first torque transmission device, a good gradation of the individual transmission ratios, which are realizable with the motor vehicle transmission, is achievable.

In a preferred embodiment of the invention, the sun pinion of the third planetary gear set is selectively non-rotatably connectable with a second one of the torque transmission devices to the transmission housing in a selectively non-rotatable manner. In particular by means of such an arrangement of the second torque transmission device, a good gradation of the individual transmission ratios, which are realizable with the motor vehicle transmission, is achievable.

In a preferred embodiment of the invention, one of the transmission elements of the second planetary gear set is selectively non-rotatably connectable with a third one of the torque transmission devices to the transmission housing. Further preferentially, the internal gear or the sun pinion of the second planetary gear set is selectively non-rotatably connectable with the third torque transmission device to the transmission housing. In particular by means of such an arrangement of the third torque transmission device, a good gradation of the individual transmission ratios, which are realizable with the motor vehicle transmission in a particularly efficient manner is achievable.

In a preferred embodiment of the invention, two transmission elements of the first planetary gear set are selectively non-rotatably connectable with a fourth one of the torque transmission devices to one another. In particular by connecting two transmission elements of the same planetary gear set a prevention of a rolling movement during the power transmission by this planetary gear set is made possible and the planetary gear set thus circulates during the power transmission as a locked element and the power transmission is possible in a particularly efficient manner. Further preferentially in the first planetary gear set the sun pinion is selectively non-rotatably connectable to the planet-gear carrier or preferentially the planet-gear carrier to the internal gear or preferably the internal gear to the sun pinion by way of this fourth torque transmission device. In particular by interlocking the first planetary gear set with the fourth torque transmission device, a transmission ratio with particularly high efficiency is realizable.

In a preferred embodiment of the invention, the second spur gear of the first spur gear stage is selectively non-rotatably connectable with a fifth one of the torque transmission devices to the sun pinion of the third planetary gear set. In particular by means of such an arrangement of the fifth torque transmission device, a good gradation of the individual transmission ratios, which are realizable with the motor vehicle transmission, is achievable.

In a preferred embodiment of the invention, the second spur gear of the first spur gear stage is selectively non-rotatably connectable with a sixth one of the torque transmission devices to one of the transmission elements of the second planetary gear set. In particular by means of such an arrangement of the sixth torque transmission device a good gradation of the individual transmission ratios, which are realizable with the motor vehicle transmission, is achievable.

In a preferred embodiment of the invention, the planet-gear carrier of the first planetary gear set is, in particular permanently, non-rotatably connected to the first spur gear of the second spur gear stage. In particular by means of such a non-rotatable connection, an efficient power transmission from the first planetary gear set to the second spur gear stage is made possible.

In a preferred embodiment of the invention, for the first coupling the internal gear of the second planetary gear set is non-rotatably or rotationally rigidly connected to the internal gear of the third planetary gear set and furthermore, for the second coupling the sun pinion of the second planetary gear set is preferably non-rotatably or rotationally rigidly connected to the planet-gear carrier of the third planetary gear set. In particular by means of such a coupling of the second to the third planetary gear set, a particularly compact construction of the motor vehicle transmission is made possible.

In a preferred embodiment of the invention, the planet-gear carrier of the second planetary gear set is non-rotatably connected to the second spur gear of the second spur gear stage. In particular by means of such a connection, a particularly simple power transmission from the second spur gear stage to the second planetary gear set is made possible.

In a preferred embodiment of the invention, the transmission output shaft is non-rotatably connected to the internal gear of the third planetary gear set. In particular by means of such a configuration of the invention, a particularly simple and efficient power transmission from the third planetary gear set to the transmission output shaft is made possible.

In a further embodiment of the invention, for the first coupling the planet-gear carrier of the second planetary gear set is non-rotatably or rotationally rigidly connected to the planet-gear carrier of the third planetary gear set and further preferentially, for the second coupling the sun pinion of the second planetary gear set is non-rotatably or rotationally rigidly connected to the sun pinion of the third planetary gear set. In particular by means of such a configuration of the invention, a particularly simple construction of the second and third planetary gear set is made possible.

In a preferred embodiment of the invention, the planet-gear carrier of the third planetary gear set is non-rotatably connected to the transmission output shaft. In particular by means of such a configuration of the invention a particularly compact construction of the motor vehicle transmission is made possible.

Furthermore, a motor vehicle is provided which comprises a drive train having at least one, preferentially having multiple prime movers. Preferably, a motor vehicle transmission of the type described above is provided in this drive train for transmitting the drive power from at least one of these prime movers to at least one, preferentially to multiple driven motor vehicle axles.

Other objects, advantages and novel features of the present invention will become apparent from the following detailed description of one or more preferred embodiments when considered in conjunction with the accompanying drawings.

DETAILED DESCRIPTION OF THE DRAWINGS

Figures 1, 2:
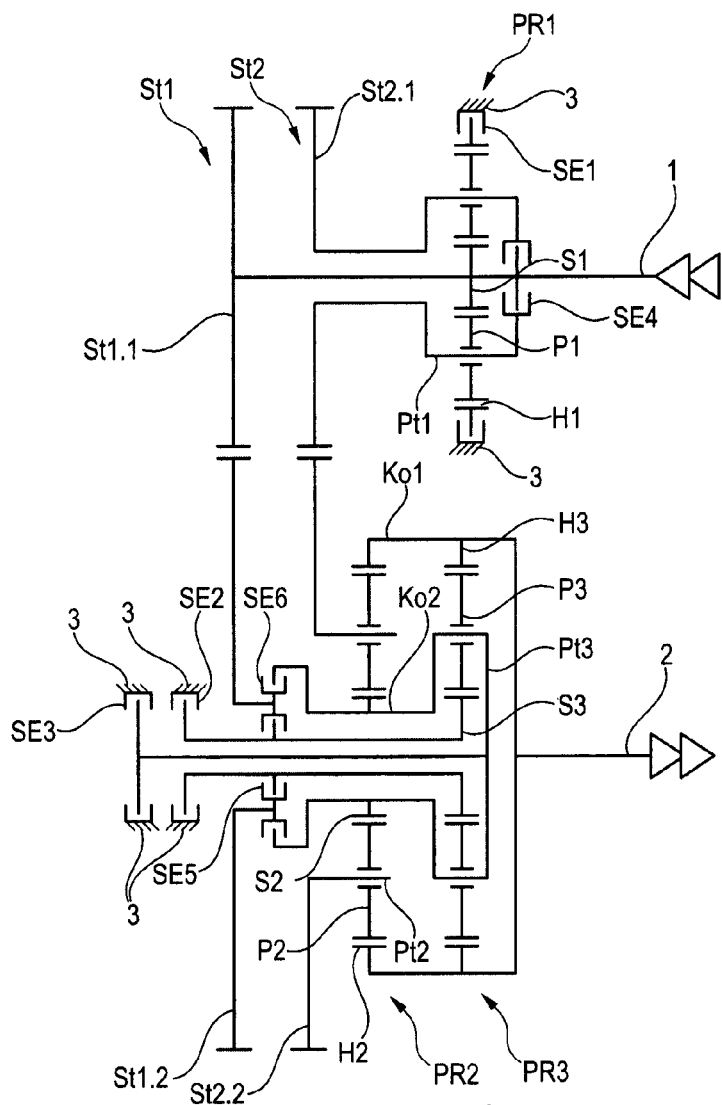
FIG. 1 is a sectional representation of a first embodiment of the motor vehicle transmission according to the invention.
FIG. 2 is a shifting diagram for the embodiment shown in FIG. 1.

In FIG. 1, a first embodiment of the motor vehicle transmission having three planetary gear sets PR1, PR2, PR3 and eight forward gears and one reverse gear is shown.

The motor vehicle transmission comprises a transmission input shaft 1 and a transmission output shaft 2 which are rotatably received in the transmission housing 3. With the torque transmission devices SE1 to SE6, the transmission ratio between the transmission input shaft 1 and the transmission output shaft 2 is changeable in discrete steps (gears).

The first planetary gear set PR1 comprises a first sun pinion S1, a first internal gear H1 and a first planet-gear carrier Pt1 with planet gears P1 rotatably mounted thereon. The internal gear H1 is selectively non-rotatably connectable to the transmission housing 3 by means of the first torque transmission device SE1 formed as brake.

The first planetary gear set PR1 is arranged concentrically relative to the transmission input shaft 1. The transmission output shaft 2 is arranged axially parallel to and radially spaced apart from the transmission input shaft 1. The second planetary gear set PR2 and the third planetary gear set PR3 are arranged concentrically relative to one another and concentrically relative to the transmission output shaft 2.

The second planetary gear set PR2 comprises a second sun pinion S2, a second internal gear H2 and a second planet-gear carrier Pt2 with planet gears P2 rotatably mounted on the same. The third planetary gear set PR3 comprises a third sun pinion S3, a third internal gear H3 and a third planet-gear carrier Pt3 with planet gears P3 rotatably mounted on the same.

The second planetary gear set PR2 and the third planetary gear set PR3 are connected to one another for power transmission via a first coupling Ko1 and via a second coupling Ko2. For the first coupling Ko1, the internal gear H2 of the second planetary gear set PR2 is permanently non-rotatably connected to the internal gear H3 of the third planetary gear set PR3. For the second coupling Ko2, the sun gear S2 of the second planetary gear set PR2 is permanently non-rotatably connected to the planet-gear carrier Pt3 of the third planetary gear set PR3. In particular by means of this configuration of the couplings Ko1 and Ko2 a particularly good matching of the transmission stages of the motor vehicle transmission is made possible.

The sun pinion S3 of the third planetary gear set PR3 is selectively non-rotatably connectable to the transmission housing 3 by means of the second torque transmission device SE2 configured as brake. The planet-gear carrier Pt3 of the third planetary gear set PR3 and thus the sun pinion S2 of the second planetary gear set PR2 are selectively non-rotatably connectable to the transmission housing by means of the third torque transmission device SE3 configured as brake, since these are connected to one another by means of the second coupling Ko2.

The transmission input shaft 1 is selectively non-rotatably connectable to the planet-gear carrier Pt1 of the first planetary gear set PR1 with a fourth torque transmission device SE4 configured as coupling and thus selectively non-rotatably connectable to the first spur gear St2.1 of the second spur gear stage ST2. The first spur gear stage St1 and the second spur gear stage St2 are arranged in the torque transmission direction from the transmission input shaft 1 to the transmission output shaft 2 between these. The first spur gear St1.1 of the first spur gear stage St1 is permanently non-rotatably connected to the sun pinion S1 of the first planetary gear set PR1.

The first spur gear St1.1 of the first spur gear stage ST1 is in engagement with a second spur gear St1.2 of the same spur gear stage St1. The first spur gear St2.1 of the second spur gear stage St2 is in engagement with a second spur gear St2.2 of the same spur gear stage St2. By way of these two spur gear stages St1 and St2, the drive power fed from the transmission input shaft 1 to the motor vehicle transmission is transmittable in the direction of the second and third planetary gear set PR2 and PR3.

The second spur gear St1.2 of the first spur gear stage St1 is selectively non-rotatably connectable to the sun pinion S3 of the third planetary gear set PR3 by means of the fifth torque transmission device SE5 designed as coupling. The sun pinion S2 of the second planetary gear set PR2 is selectively non-rotatably connectable to the second spur gear St1.2 of the first spur gear stage St1 by means of the sixth torque transmission device SE6 designed as coupling. By way of the second coupling Ko2 the planet-gear carrier Pt3 of the third planetary gear set PR3 is likewise, by means of the sixth torque transmission device SE6, selectively non-rotatably connectable to the second spur gear St1.2 of the first spur gear stage St1.

For the case (fifth gear) that the fifth and sixth torque transmission device SE5, SE6 are activated, i.e. that a torque is transmittable with these, the second and third planetary gear set PR2, PR3 circulate in a locked manner and a high efficiency is achievable.

The second spur gear St2.2 of the second spur gear stage St2 is permanently non-rotatably connected to the land Pt2 of the second planetary gear set PR2. The transmission output shaft 2 is permanently non-rotatably connected to the first coupling Ko1 or to the internal gear H3 of the third planetary gear set PR3.

FIG. 2 shows a shifting diagram for the embodiment of the motor vehicle transmission shown in FIG. 1. Here, an X in the table means that for activating the respective gear the marked torque transmission device is activated, which means that a torque is transmittable with the same, while in the non-activated state, no torque can be transmitted with the same. It is evident that the torque transmission devices SE1 to SE6 are arranged in such a manner that for each individual gear (reverse to eighth gear) only two of these torque transmission devices (SE1 to SE6) are activated in each case and that with each gear change from an n-th into an n+1-th gear or vice versa, one of these two activated torque transmission devices remains activated. The respective other one of these two torque transmission devices is deactivated for shifting from the n-th into the n+1-th gear or vice versa and a single one of the other torque transmission devices, which was not activated before, is activated for this shifting operation. In particular by way of this characteristic of the motor vehicle transmission, which is achieved in particular through the configuration of the same described above, an automation of the shifts is made possible and further preferentially a shifting of the transmission that is at least approximately or completely free of tractive force interruption is thus made possible.

Figures 3, 4:
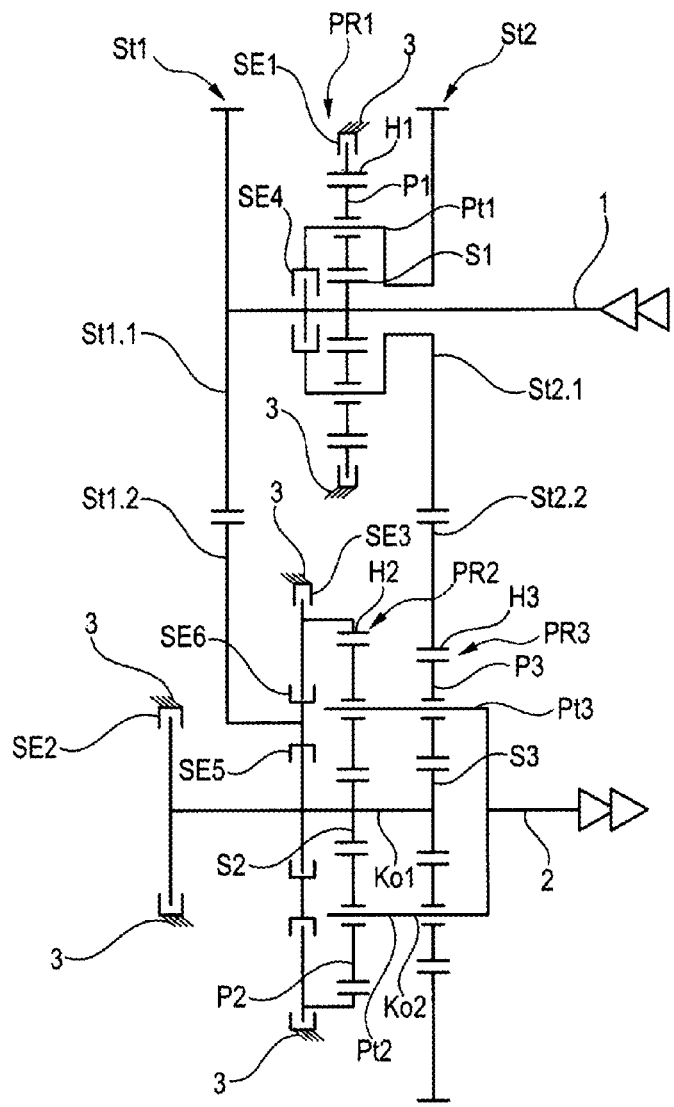
FIG. 3 is a sectional representation of a second embodiment of the motor vehicle transmission according to the invention.
FIG. 4 is a shifting diagram for the embodiment shown in FIG. 2.

In FIG. 3, a further embodiment of the motor vehicle transmission having three planetary gear sets PR1, PR2, PR3 and eight forward gears and one reverse gear is shown.

The motor vehicle transmission comprises a transmission input shaft 1 and a transmission output shaft 2 which are rotatably received in the transmission housing 3. With the torque transmission devices SE1 to SE6 the transmission ratio between the transmission input shaft 1 and the transmission output shaft 2 is changeable in discrete stages (gears).

The first planetary gear set PR1 comprises a first sun pinion S1, a first internal gear H1 and a first planet-gear carrier Pt1 with planet gears P1 rotatably mounted thereon. The internal gear H1 is selectively non-rotatably connectable to the transmission housing 3 by means of the first torque transmission device SE1 designed as brake.

The first planetary gear set PR1 is arranged concentrically relative to the transmission input shaft 1. The transmission output shaft 2 is arranged axially parallel to and radially spaced apart from the transmission input shaft 1. The second planetary gear set PR2 and the third planetary gear set PR3 are arranged concentrically relative to one another and concentrically relative to the transmission output shaft 2.

The second planetary gear set PR2 comprises a second sun pinion S2, a second internal gear H2 and a second planet-gear carrier Pt2 with planet gears P2 rotatably mounted on the same. The third planetary gear set PR3 comprises a third sun pinion S3, a third internal gear H3 and a third planet-gear carrier Pt3 with planet gears P3 rotatably mounted on the same.

The second planetary gear set PR2 and the third planetary gear set PR3 are connected to one another for the power transmission via a first coupling Ko1 and via a second coupling Ko2. For the first coupling Ko1, the sun pinion S2 of the second planetary gear set PR2 is permanently non-rotatably connected to the sun pinion S3 of the third planetary gear set PR3. For the second coupling Ko2, the planet-gear carrier Pt2 of the second planetary gear set PR2 is permanently non-rotatably connected to the planet-gear carrier Pt3 of the third planetary gear set PR3. In particular by means of this configuration of the couplings Ko1 and Ko2 a particularly good matching of the transmission stages of the motor vehicle transmission is made possible.

The sun pinion S2 of the second planetary gear set PR2 and the sun pinion S3 of the third planetary gear set PR3 are selectively non-rotatably connectable to the transmission housing 3 by means of the second torque transmission device SE2 configured as brake. The internal gear H2 of the second planetary gear set is selectively non-rotatably connectable to the transmission housing 3 by means of the third torque transmission device SE3 configured as brake.

The transmission input shaft 1 is selectively non-rotatably connectable to the planet-gear carrier Pt1 of the first planetary gear set PR1 with a fourth torque transmission device SE4 configured as coupling and thus selectively non-rotatably connectable to the first spur gear St2.1 of the second spur gear stage St2. Furthermore, by closing the coupling SE4 (torque transmission made possible), the first planetary gear set PR1 is locked and circulates during the power transmission without causing rolling losses.

The first spur gear stage St1 and the second spur gear stage St2 are arranged in torque transmission direction from the transmission input shaft 1 to the transmission output shaft 2 between these. The first spur gear St1.1 of the first spur gear stage St1 is permanently non-rotatably connected to the sun pinion S1 of the first planetary gear set PR1.

The first spur gear St1.1 of the first spur gear stage St1 is in engagement with a second spur gear St1.2 of the same spur gear stage St1. The first spur gear St2.1 of the second spur gear St2 is in engagement with a second spur gear St2.2 of the same spur gear stage St2. By way of these two spur gear stages St1 and St2, the drive power fed from the transmission input shaft 1 to the motor vehicle transmission is transmittable in the direction of the second and third planetary gear set PR2 and PR3.

The second spur gear St1.2 of the first spur gear stage St1 is selectively non-rotatably connectable to the sun pinion S3 of the third planetary gear set PR3 and simultaneously to the sun pinion S2 of the second planetary gear set PR2 by means of the fifth torque transmission device SE5 designed as coupling.

The internal gear H2 of the second planetary gear set PR2 is selectively non-rotatably connectable to the second spur gear St1.2 of the first spur gear stage St1 by means of the sixth torque transmission device SE6 designed as coupling.

For the case (fifth gear) that the fifth and sixth torque transmission device SE5, SE6 are activated, i.e. that a torque is transmittable with these, the second and third planetary gear set PR2, PR3 circulate in a locked manner and a high efficiency is achievable.

The second spur gear St2.2 of the second spur gear stage St2 is permanently non-rotatably connected to the internal gear H3 of the third planetary gear set PR3. The transmission output shaft 2 is permanently non-rotatably connected with the second coupling Ko2 or with the planet-gear carrier Pt3 of the third planetary gear set PR3 to the planet-gear carrier Pt2 of the second planetary gear set PR2.

The shifting diagram for the embodiment of the motor vehicle transmission shown in FIG. 3 is shown in FIG. 4. This shifting diagram differs from the shifting diagram shown in FIG. 2 by the formation of the eighth gear.

Expressed in other words, it should be noted with regard to the motor vehicle transmission according to the invention that the available installation spaces for motor vehicle transmissions, in particular in front-transverse applications (front wheel drive, drive motor installed transversely to the traveling direction of the motor vehicle) are restricted especially in the axial direction, i.e. in the axial direction of the transmission input shaft or transmission output shaft.

In order to achieve a compact construction of the motor vehicle transmission in particular in this direction, the invention proposes providing a transmission input shaft 1 and a transmission output shaft 2 which are arranged axially parallel to and radially spaced apart from one another in a transmission housing 3. The motor vehicle transmission is preferentially automatically shiftable by a transmission control and can therefore be considered as an automatic transmission which comprises eight forward gears and one reverse gear. In particular by way of the described configuration, this motor vehicle transmission has a large transmission spacing (ratio of greatest transmission ratio to smallest transmission ratio), which is in particular greater or can be greater than 8.

In the invention, the first planetary gear set PR1 is concentrically arranged relative to the transmission input shaft 1 and the second and the third planetary gear set PR2, PR3 are concentrically arranged relative to the transmission output shaft 2. Based on the power transmission from the transmission input shaft 1 to the transmission output shaft 2, two spur gear stages St1, St2 are arranged between these. Furthermore, the motor vehicle transmission comprises six torque transmission devices to be considered as shifting elements SE1 to SE6. These are composed of three brakes (SE1, SE2, SE3) and three couplings (SE4, SE5, SE6). In particular the first torque transmission device SE1 and the third torque transmission device SE3 can be embodied as positively engaged torque transmission devices, preferentially as dog-type shifting element or sliding sleeve shifting element.

Through the distribution of the planetary gear sets PR1, PR2, PR3 and of the torque transmission devices SE1 to SE6 concentrically relative to the transmission input shaft and the transmission output shaft and because of their arrangement in the transmission housing, the axial installation space compared with other embodiments of a motor vehicle transmission with similar or the same characteristics can be reduced by means of the invention.

LIST OF REFERENCE NUMBERS

1 Transmission input shaft
2 Transmission output shaft
3 Transmission housing
H1, H2, H3 Internal gears
Ko1, Ko2 Couplings between second and third planetary gear set
P1, P2, P3 Planet gears
Pt1, Pt2, Pt3 Planet-gear carriers
PR1, PR2, PR3 Planetary gear sets
S1, S2, S3 Sun pinions
SE1 to SE6 Torque transmission devices
St1, St2 Spur gear stages
St1.1, St2.1 First spur gears of St1, St2
St1.2, St2.2 Second spur gears of St1, St2

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A motor vehicle transmission, comprising:
a transmission input shaft and a transmission output shaft, which are arranged axially parallel to and radially spaced apart from one another;
a transmission housing; and
three planetary gear sets, each comprising transmission elements of a sun pinion, internal gear and planet-gear carrier for rotatable reception of at least one planet gear,
wherein
a first of the three planetary gear sets is arranged concentrically relative to the transmission input shaft and a second and third of the third planetary gear sets are arranged concentrically relative to the transmission output shaft,
at least one transmission element of the first planetary gear set is non-rotatably connected to the transmission input shaft and at least one transmission element of the third planetary gear set is non-rotatably connected to the transmission output shaft,
a multiplicity of torque transmission devices, which are provided for changing a transmission ratio between the transmission input shaft and transmission output shaft, two spur gear stages, which based on the power transmission are arranged between the transmission input shaft and the transmission output shaft, each comprising a first spur gear, which is arranged concentrically relative to the transmission input shaft and a second spur gear which is arranged concentrically relative to the transmission output shaft, the second and third planetary gear sets are connected to one another via a first and a second coupling, for the first coupling, one of the transmission elements of the second planetary gear set is connected to a respective same transmission element of the third planetary gear set, for the second coupling, a further one of the transmission elements of the second planetary gear set is connected to a further one of the transmission elements of the third planetary gear set, and the transmission input shaft is non-rotatably connected to the sun pinion of the first planetary gear set.

2. The motor vehicle transmission according to claim 1, wherein the sun pinion of the first planetary gear set is non-rotatably connected to the first spur gear of the first spur gear stage.

3. The motor vehicle transmission according to claim 2, wherein the planet-gear carrier of the first planetary gear set is non-rotatably connected to the first spur gear of the second spur gear stage.

4. The motor vehicle transmission according to claim 3, wherein the internal gear of the first planetary gear set is selectively non-rotatably connectable with a first of the torque transmission devices to the transmission housing.

5. The motor vehicle transmission according to claim 4, wherein the sun pinion of the third planetary gear set is selectively non-rotatably connectable with a second one of the torque transmission devices to the transmission housing.

6. The motor vehicle transmission according to claim 5, wherein one of the transmission elements of the second planetary gear set is selectively non-rotatably connectable with a third one of the torque transmission devices to the transmission housing.

7. The motor vehicle transmission according to claim 6, wherein the internal gear or the sun pinion of the second planetary gear set is selectively non-rotatably connectable with the third torque transmission device to the transmission housing.

8. The motor vehicle transmission according to claim 6, wherein two transmission elements of the first planetary gear set are selectively non-rotatably connectable with a fourth one of the torque transmission devices to one another.

9. The motor vehicle transmission according to claim 8, wherein in the first planetary gear set, the sun pinion is selectively non-rotatably connectable to the planet-gear carrier or the planet-gear carrier to the internal gear or the internal gear to the sun pinion by way of the fourth torque transmission device.

10. The motor vehicle transmission according to claim 8, wherein the second spur gear of the first spur gear stage is selectively non-rotatably connectable with a fifth one of the torque transmission devices to the sun pinion of the third planetary gear set.

11. The motor vehicle transmission according to claim 10, wherein the second spur gear of the first spur gear stage is selectively non-rotatably connectable with a sixth one of the torque transmission devices to one of the transmission elements of the second planetary gear set.

12. The motor vehicle transmission according to claim 11, wherein the internal gear or the sun pinion of the second planetary gear set is selectively non-rotatably connectable with the sixth torque transmission device to the second spur gear of the first spur gear stage.

13. The motor vehicle transmission according to claim 1, wherein the planet-gear carrier of the first planetary gear set is connected to the first spur gear of the second spur gear stage.

14. The motor vehicle transmission according to claim 1, wherein for the first coupling, the internal gear of the second planetary gear set is non-rotatably connected to the internal gear of the third planetary gear set and, for the second coupling, the sun pinion of the second planetary gear set is non-rotatably connected to the planet-gear carrier of the third planetary gear set.

15. The motor vehicle transmission according to claim 14, wherein the planet-gear carrier of the second planetary gear set is non-rotatably connected to the second spur gear of the second spur gear stage.

16. The motor vehicle transmission according to claim 14, wherein the transmission output shaft is non-rotatably connected to the internal gear of the third planetary gear set.

17. The motor vehicle transmission according to claim 1, wherein for the second coupling, the planet-gear carrier of the second planetary gear set is non-rotatably connected to the planet-gear carrier of the third planetary gear set, and for the first coupling, the sun pinion of the second planetary gear set is non-rotatably connected to the sun pinion of the third planetary gear set.

18. The motor vehicle transmission according to claim 17, wherein the planet-gear carrier of the third planetary gear set is non-rotatably connected to the transmission output shaft.

19. A motor vehicle comprising the motor vehicle transmission according to claim 1.

* * * * *